May 5, 1936.   R. D. COLLINS ET AL   2,039,519
PAY STATION COIN COLLECTING SYSTEM
Original Filed Dec. 22, 1930   4 Sheets-Sheet 1
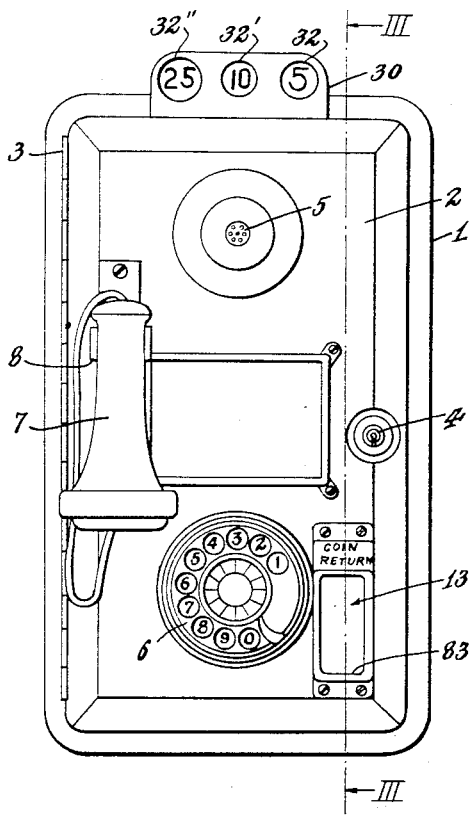
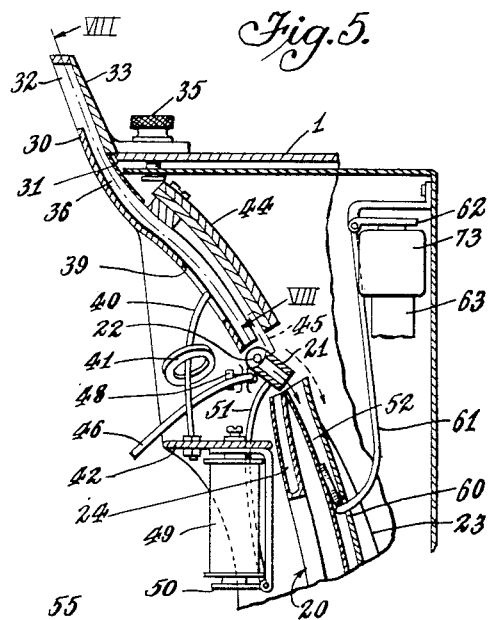
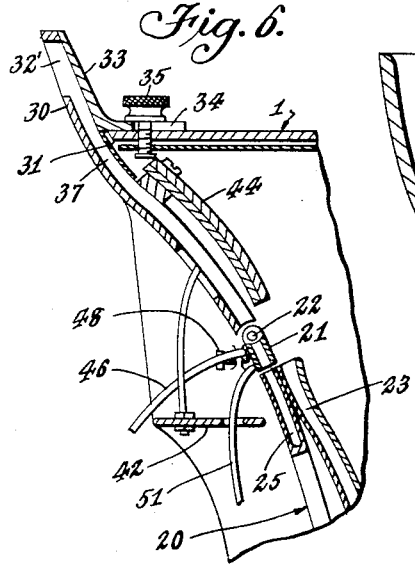
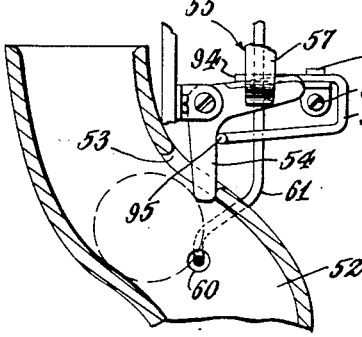
Inventors
Ralph D. Collins
William M. Reid
Stanley E. Bourne
By Lyon & Lyon
Attorneys May 5, 1936.  R. D. COLLINS ET AL  2,039,519
PAY STATION COIN COLLECTING SYSTEM
Original Filed Dec. 22, 1930   4 Sheets-Sheet 3
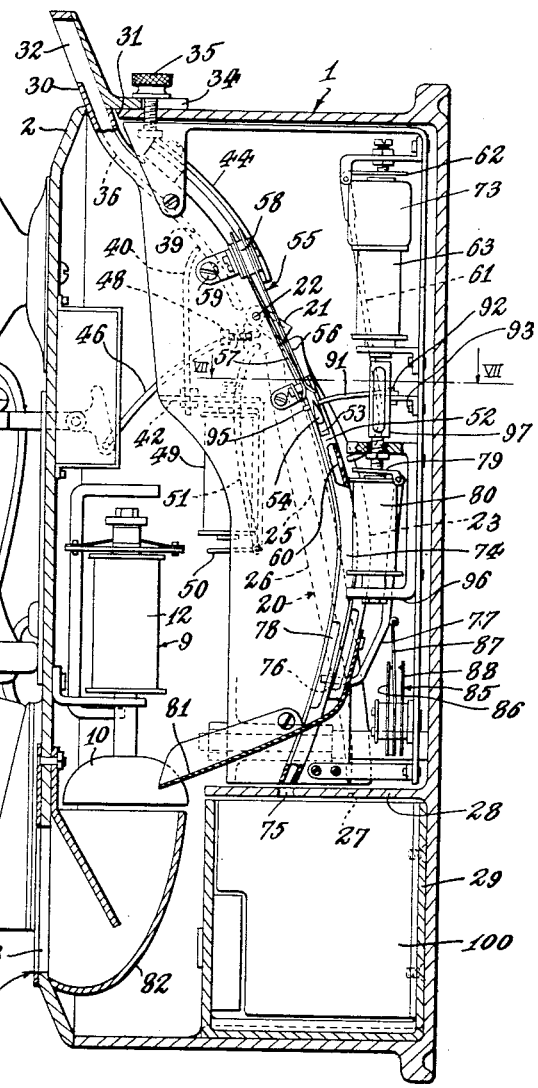
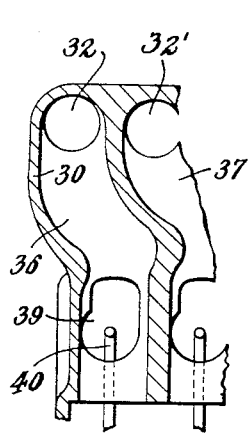
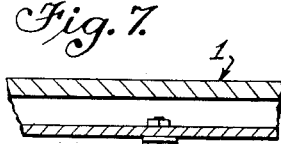
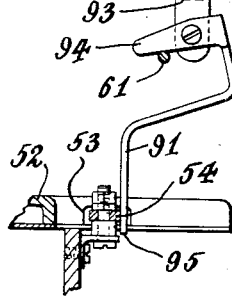
Inventors
Ralph D. Collins
William M. Reid
Stanley E. Bourne
By
Lyon & Lyon
Attorneys Patented May 5, 1936

2,039,519

UNITED STATES PATENT OFFICE 2,039,519

PAY STATION COIN COLLECTING SYSTEM

Ralph D. Collins, William M. Reid, and Stanley E. Bourne, Los Angeles, Calif., assignors to Associated Telephone Utilities Company, Chicago, Ill., a corporation of Delaware Original application December 22, 1930, Serial No. 503,952. Divided and this application July 31, 1931, Serial No. 554,190. Renewed January 16, 1935

12 Claims. (Cl. 194—16)

Our invention relates to telephone stations and has particular reference to a telephone system adapted for pay station telephones.

Pay station telephones at the present time designed to secure the collection of coins or tokens in payment of telephone service are handicapped by several disadvantages, particularly with reference to the amount of central station equipment required for the completion of calls from such pay telephone stations and for the collection of the coins deposited in such stations.

This application is a division of our co-pending application, Serial No. 503,952, filed December 22, 1930, and is directed to a Pay station coin collecting system.

It is an object of our invention, therefore, to provide a pay telephone station in which all of the apparatus necessary for the proper collection and refund of coins may be located at the station, requiring no special apparatus at the central station.

Another object of our invention is to provide a pay telephone station of the character described in the preceding paragraph, in which the equipment required at the central station is only that required for the proper connection of our station to another station with which it is desired to communicate.

Another object of our invention is to provide a pay telephone station in which a single coin collecting device may be employed to collect coins for either local service or for long-distance service.

Another object of our invention is to provide a pay telephone station in which a plurality of coin slots are provided and in which one of said slots is connected by a chute to either a local collection receptacle or a long-distance collection receptacle.

Another object of our invention is to provide a pay telephone station as described in the preceding paragraph in which the local collections are segregated from the long-distance collections.

Another object of our invention is to provide a pay telephone station in which a coin collecting device is so arranged as to refund all coins deposited therein unless the service for which the coins were deposited is rendered.

Another object of our invention is to provide a pay telephone station for both local and long-distance service in which the deposit of a first coin in a coin chute will secure local service or will connect the station to a long-distance operator, and in which further coins deposited in said chute will pass directly to a long-distance collection receptacle.

Another object of our invention is to provide a pay telephone station for connection to a line circuit, to which line circuit a non-pay extension may be connected for both incoming and outgoing service.

Another object of our invention is to provide a pay telephone station in which a line circuit connected to said station is normally inoperative for outgoing service and in which the deposit of a coin renders the station operative for outgoing service independent of subsequent interruptions of said line circuit.

Another object of our invention is to provide a pay telephone station as described in the preceding paragraph in which the selection of a called station is achieved by interruptions of the line circuit and in which such interruptions may be made without rendering said 'phone ineffective.

Another object of our invention is to provide a pay telephone station in which a slow releasing magnet is employed for arresting a deposited coin to prevent momentary interruptions of the line circuit to the 'phone effecting a collection of the coin.

Another object of our invention is to provide a pay telephone station in which an alarm is given by the refunding of a coin.

Another object of our invention is to provide a passage for a refunded coin, which passages includes the ringing bell of said station so that refunded coins are caused to strike that bell.

Another object of our invention is to provide a pay telephone station in which the station is normally ineffective for outgoing service and in which shocks to said station are prevented from rendering the station effective for outgoing service.

Other objects of our invention will be apparent from a study of the following specification read in connection with the accompanying drawings, wherein Figure 1 is a front elevational view of a pay telephone station constructed in accordance with our invention;

Figure 3 is a vertical sectional view taken along line III—III of Figure 1;

Figure 4 is a detail view partly in section of a coin actuated switch to be operated by a coin passing through a collection chute;

Figure 5 is a detail sectional view of the local and long-distance collection chutes taken along line V—V of Figure 2 showing the action of the transfer basket or diverting means for these chutes;

Figure 6 is a detail sectional view of another of the coin chutes taken along line VI—VI of Figure 2 and illustrating the transfer basket in long-distance position;

Figure 7 is a detail view taken along line VII—VII of Figure 3 illustrating the restoring device for the coin actuated switch shown in Figure 4;

Figure 8 is a detail sectional view taken along line VIII—VIII of Figure 5 illustrating the upper portion of the coin passages and illustrating particularly a device for catching spurious coins.

Figure 2:
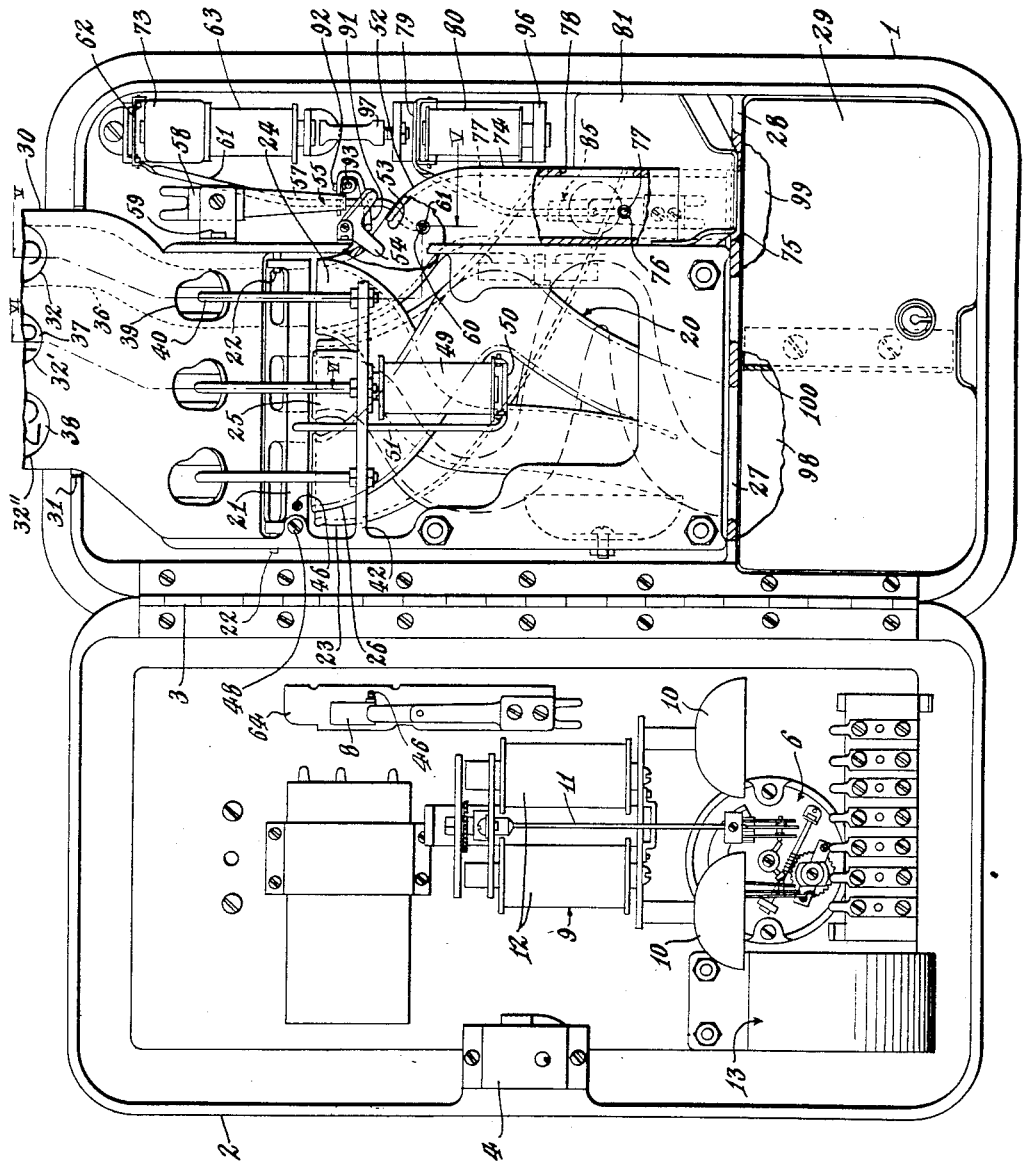
Figure 2 is a front elevational view of a pay telephone station constructed in accordance with our invention showing the telephone box in open position.

Referring to the drawings, we have illustrated in Figure 1 a pay telephone station comprising a housing 1 to which may be secured a cover 2 as by means of a hinge 3, the cover being located in closed position, if desired, by means of a lock illustrated at 4.

The cover 2 of the housing 1 constitutes the mounting device for the talking, listening and station selecting device and ringer, that is, a transmitter 5 is secured near the upper end of the cover 1 while a calling dial 6 is mounted near the lower end of the cover, the receiver 7 being mounted upon a suitable hook 8 which is secured to the left hand side of the cover 2.

To the rear of the cover 2 we have illustrated a ringer 9 comprising the usual set of gongs or bells 10 operated by a clapper 11 which is in turn vibrated by a pair of magnets 12.

It will be observed that the ringer 9 is illustrated as being so mounted that one of the bells 10 is positioned immediately above a "coin return" or refund receptacle 13, which receptacle is secured to the cover member 2. As will hereinafter be described, such mounting of the gongs or bells 10 enables the bells to be struck by a refunded coin to thus attract attention of a person using the phone to the fact that the coin has been returned.

Mounted within the box or housing 1 we have illustrated a coin collecting device arranged for the collection of coins for both local and long-distance service. This coin collecting device is illustrated as comprising a coin maze 20 of the character well known in the telephone art familiarly used in connection with long-distance collection of coins in long-distance pay stations. As will be understood by those skilled in the art, this maze comprises a coin chute for each of a plurality of different denomination coins, each chute being so arranged as to pass the coins deposited therein over a series of bells or gongs to produce an audible indication of the character and denomination of the coin deposited.

The coin maze 20 is illustrated as having each of the coin chutes terminating immediately beneath a diverting device or transfer basket 21 which is pivotally secured as at 22 to be moved into a position in alignment with the coin chutes (as illustrated in Figure 6), or to a rearward position in alignment with a refund chute 23.

By referring particularly to Figure 2 it will be observed that the coin maze 20 is illustrated as comprising a slot or chute 24 arranged for the reception of a small denomination coin, such as a nickel. A second slot or chute 25 is illustrated as being arranged to receive coins in larger denominations, such as dimes, while a third chute 26 is illustrated as being arranged to receive still larger denomination coins such as quarters. It will be understood that the number and arrangement of such chutes may be varied to fit any denomination of coin which it is desired to employ in our telephone station.

It will also be observed that the refund chute 23 is illustrated as comprising a single chute which extends into alignment with both the dime chute 25 and the quarter chute 26 so that this refund chute constitutes a common receptacle into which both dimes and quarters may pass to be refunded.

It will also be observed from an inspection of Figure 2 that all three of the chutes 24, 25 and 26 have their lower ends terminating in a passage in a partitioned plate 28 which divides the lower portion of the housing 1 from the remainder thereof. This lower portion of the housing 1 may constitute a compartment into which may be inserted a collection receptacle 29. It will be understood that the collection receptacle 29 will have a suitable opening in the upper side thereof alignable with the opening 27 in the partition plate 28 so that any coin which passes into the chutes 24, 25 or 26 will pass immediately into the collection receptacle 29.

By referring to the upper portion of Figure 2 it will be observed that we have provided a guiding device 30 leading to the transfer basket 21. This guiding device is illustrated as comprising a suitable box-like housing which has a plurality of coin slots located therein, one for each of the different denomination coins for which the chutes 24, 25 and 26 are selected. By referring particularly to Figures 1 and 3 it will be observed that the guiding device 30 extends upwardly through a suitable opening 31 in the upper side of the housing 1, the slots therethrough terminating in a coin gauge 32. This coin gauge may be constructed as by perforating the front wall of the guiding device 30 with an opening of just such size as will admit a coin of the proper denomination, this perforation joining the slot through which the coin passes on its way through the guiding device 30.

We prefer to form the guiding device 30 with the upper end of the rear wall thereof open, this open space being closed by a suitable plate 33 which extends across the guide 30 past all of the coin gauge perforations 32. That is, the plate 33 extends behind the perforation 32 for the nickel gauge, the perforation 32' for the dime gauge, and the perforation 32" for the quarter gauge.

It will be observed that the plate 33 is secured to the top of the housing 1 as by means of a slot 34 through which an adjusting screw 35 passes so that this plate 33 may be adjusted forwardly and rearwardly with respect to the guide 30 to permit of adjustment of the depth of the slots through the guide 30 to thereby accurately gauge the thickness of the coins which are permitted to pass through such slots. That is, the plate 33 may be adjusted so as to provide just that space which is required for the passage of a coin whose thickness corresponds exactly with that of a newly minted nickel.

Intermediate the coin gauge 32 and the lower end of the guide 30 we have illustrated each of the slots (36 for the nickel, 37 for the dime and 38 for the quarter) with a pair of devices for detecting and catching spurious coins.

One of these spurious coin detecting devices comprises an opening 39 in the front wall of the coin slot 36, this opening being of a diameter equal to the diameter of the coin for which this slot 36 is selected. By referring particularly to Figure 5, it will be observed that the coin gauge 30 is angled downwardly and rearwardly with respect to the housing 1 so that a coin passing through the slot 36 would tend to fall out of the slot as it passed over the opening 39. However, we have provided a pin 40, the upper end of which extends to a position adjacent the slot 36 such as to bring the upper end of the pin into substantial alignment with the forward wall of the slot 36 so that a solid coin passing through the slot 36 would have its center engaged and supported by the pin 40 and thus would be prevented from falling out of the slot 39. However, a coin which is not solid or which is perforated would not be supported by the pin 40 and would fall from the slot instead of passing on to the transfer basket 21.

The pin 40 may be employed to collect the spurious coins such as that illustrated at 41 (Figure 5) as by supporting the pin 40 upon a shelf 42 which may be formed as an integral part of the casting of which the guiding device 30 may also form a part. However, it may be desirable to provide merely a short pin secured at any point to guide 30 so that it will project across the opening 39 to support a true coin but which will permit a spurious coin to fall through the opening 39.

It will be observed that pins similar to pin 40 may be provided for each of the remaining slots 37 and 38 which are identical with the pin 40 and need not be further described herein.

The other spurious coin detecting devices may comprise a permanent magnet 44 secured to the rear of each of the slots 36, 37 and 38 at some point at which the rear of these slots may be left open so that a coin which has in its composition some material of magnetic property will be attracted from the slots (36, 37, 38) and will not be permitted to pass into the transfer basket 21. By referring particularly to Figure 5 the operation of the magnet 44 will be apparent as we have there illustrated the removal of a spurious coin 45.

The construction thus far described may be employed as a device for collecting coins for long-distance service, the transfer baskets being arranged to move about its pivot 22 to a position in alignment with either the collection branch (the chute 25 for the dimes or the chute 26 for the quarter) or to a rearward position in alignment with the rear chute 23.

The transfer basket is illustrated as being normally held in that position in which it is aligned with the refund chute 23 as by means of a rod 46 connected to the receiver hook 8 to be moved inwardly when the receiver 7 is on the hook.

Thus, at all times when the receiver 7 is on the hook any coin which is deposited in the dime gauge 32' or the quarter gauge 32" will immediately pass to the refund chute 23 and thus be refunded. As will hereafter be described, a coin deposited in the nickel gauge 32 will also be refunded.

However, as soon as the receiver is lifted from the hook the rod 46 no longer presses the basket 21 to the refund position and it therefore would move by gravity to a position of alignment with the collection branch (chute 25) for the dimes. The forward movement of the transfer basket 21 may be suitably adjusted as by means of providing an adjustable stop 48 in the form of a screw which may be moved forwardly or rearwardly to insure alignment of the basket 21 with the collection branch of the coin chute 25.

However, since immediately upon lifting the receiver a party desiring the use of the 'phone would not be in communication with the station which he desires to call, a coin which he might deposit at this time should not be collected and for this reason we have provided a magnet 49 which, as will hereinafter be described, is energized upon lifting the receiver 7 from its hook 8. When the magnet 49 is energized it operates its armature 50 to project a rod 51 against the basket 21 and thus holds the basket 21 in the refund position in spite of the fact that the original support by rod 46 has been withdrawn.

However, when the collection device is to be employed in connection with a 'phone for making both local calls and long-distance calls it is desirable that the collection of that coin which is necessary to complete a call be accomplished automatically. For this reason we have provided a local coin chute 52 preferably associated with the nickel slot 36 so that an initial coin deposited in this slot will pass to the local collection chute 52.

By referring particularly to Figures 3 and 5 it will be observed that the local collection chute 52 is located to the rear of the nickel long-distance chute 24 so that the transfer basket 21 when held in its rearward position as by means of either the receiver 7 being upon its hook 8 or by the energization of the magnet 49, the basket 22 is aligned with the local collection chute 52 and hence the deposit of a nickel in the slot 36 will cause this nickel to be passed to the local collection chute 52.

In order that collections for local calls should be made automatically we propose to construct the station in such manner that it is inoperative to permit outgoing service unless and until a coin has been deposited in the local chute. While this may be accomplished in many ways, we have illustrated a disabling device for the station as comprising a resistance which is connected to the line circuit leading from the central station to the station under consideration, this resistance being so arranged as to render it impossible for the station to select another station for the purpose of making an outgoing call.

Figure 9:
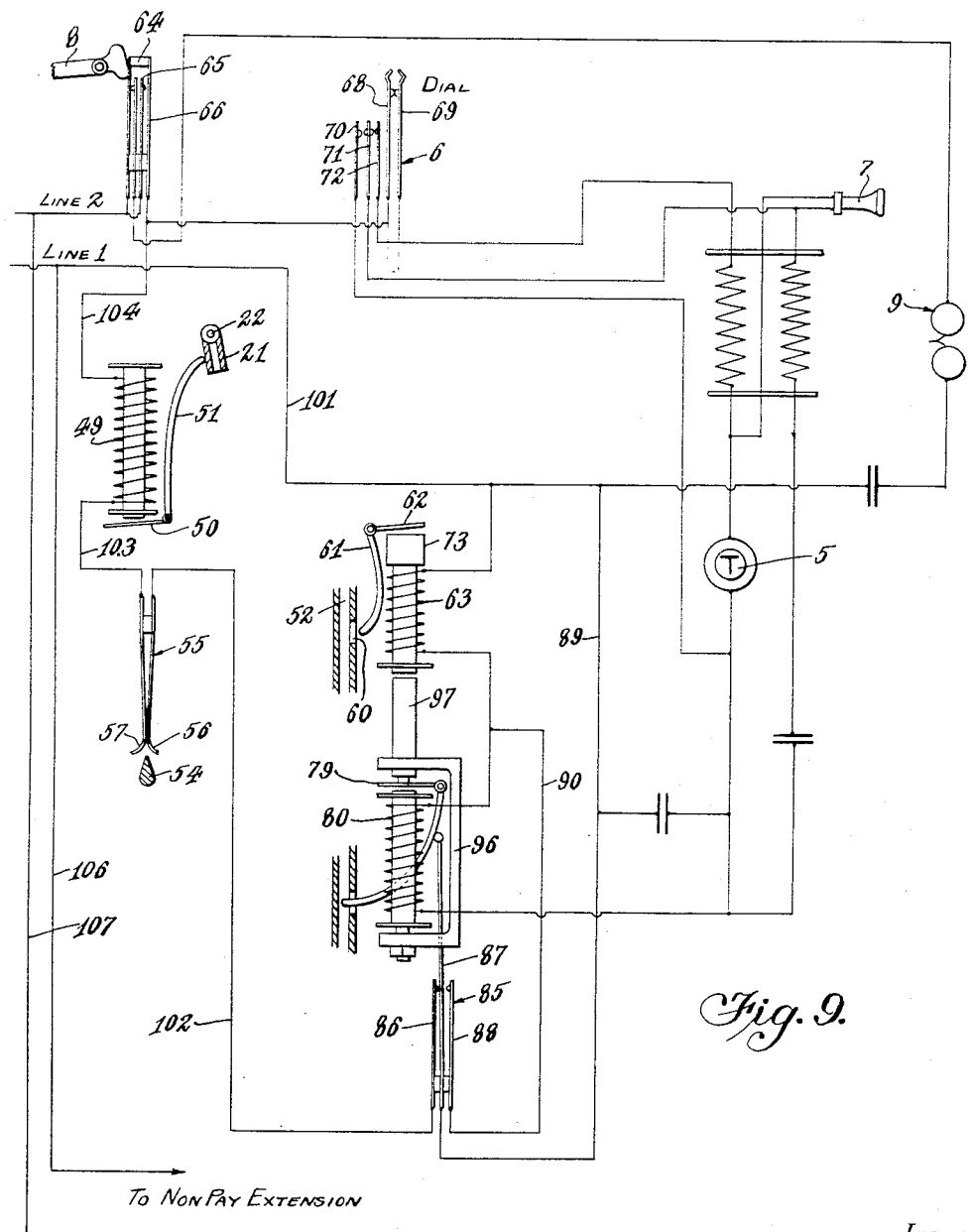
Figure 9 is a diagrammatic view of a wiring system which may be employed with a pay telephone station constructed in accordance with our invention.

For convenience we have employed the resistance represented by the winding upon the magnet 49 for the purpose of disabling the station and by referring to Figure 9 it will be observed that the magnet 49 is connected across the line circuit represented by the legends Line 1 and Line 2. This resistance represented by the coil 49 may, as will be understood by those skilled in the art, be selected as of such value as to render the talking circuits inoperative to communicate with another station, or may be arranged in the case of an automatic dial selective telephone to render the dial selecting device ineffective to operate the central station selecting equipment.

Referring again to Figure 2, it will be observed that the local collection chute 52 has a slot 53 in one of the side walls thereof through which projects the operating lever 54 of a coin actuated switch 55 so that a coin passing through the local collection chute 52 will engage and operate the switch 55. We have illustrated the contacts of the switch 55 as comprising a pair of springs 56 and 57 insulated from each other and from the metal parts of the station as at 58 and mounted upon the casting comprising a portion of the guiding device 30 as by means of a screw 59. The springs 56 and 57 are illustrated as having their lower ends located immediately above the operating arm 54 of the switch 55 and in contact with each other so that movement of the operating arm 54 will cause a portion of this arm to be inserted between the springs 56 and 57 to thereby separate the contacts. By referring to Figure 9 it will be observed that the circuit for the coil 49 extends in series relation through the contacts 56 and 57 so that when the contacts are operated the coil 49 is deenergized or, in other words, is effectively removed from the line circuit Line 1, Line 2.

By referring again to Figure 2 it will be observed that the local collection chute 52 is provided with a second slot 60 in the rear wall thereof and arranged immediately in advance of the lower end of a rod 61, which rod is connected to and is operated by the armature 62 of a magnet 63. The rod 61 is arranged to be normally retracted from the slot 60 when the magnet 63 is deenergized and is arranged to be projected into the slot 60 when the magnet 63 is energized. The projection of the rod 61 into the local collection chute 52 places an obstruction in the path of a coin passing therethrough so that during the energization of the magnet 63 any coin deposited in the local collection chute will be held in an intermediate position in this chute. It will be observed that we have illustrated the arrangement of the rod 61 with respect to the switch operating arm 54, such that during the time a coin is resting upon the rod 61 it will also be in engagement with the operating arm 54 to maintain the switch 55 in open circuit condition during this time.

By referring again to Figure 9 it will be observed that the circuit for the magnet 63 extends through the hook switch contacts 64, this circuit being illustrated as passing through the normally open contacts 65 and 66 of this switch so that during the time that the receiver 7 is upon the hook 8 the circuit for the magnet 63 is open, but as soon as the receiver is lifted from the hook the circuit for magnet 63 is closed.

The purpose of arresting the coin which has been deposited in the local chute is two-fold; first, it is desirable that the switch contacts 56 and 57 shall be maintained open during the time that the selection of the called station is made and; second, it is desirable that this coin shall be arrested prior to its arrival at any position in the chute 52 at which it must be either collected or refunded.

By referring again to Figure 9 it will be observed that an automatic selecting device is provided in circuit with the line circuit Line 1, Line 2, this selecting device being indicated by the legend "Dial". The dial selecting device is illustrated as comprising a pair of normally closed contacts 68 and 69 arranged to be separated in the manner well known in the art when the dialing device 6 (see Figure 1) is operated to select a desired station.

However, as has hereinbefore been set forth, the dial circuit is normally shunted by means of the coil or magnet 49 so that even though the contacts 68 and 69 should be separated in the normal manner of dialing or selecting another station, the separation of the contacts would be ineffective to operate the central station selecting equipment. However, as soon as a coin has been deposited in the local collection chute 52 and has operated the switch contacts 56 and 57, this shunting resistance is no longer effective upon the line circuit and subsequent separation of the dial contacts 68 and 69 will be effective to select the desired station. We have illustrated, in connection with the dial, the usual contacts 70, 71 and 72 which are arranged to be closed when the dial is moved so as to shunt the transmitter and receiver from the line circuit during dialing to thus prevent unnecessary noise in the talking and listening circuits.

It will be observed that the magnet 63 is provided with a retarding device 73 which prevents the release of the armature 62 of this magnet immediately upon the breaking of the magnet circuit. This retarding device 73 may be selected as of any suitable form though we prefer that it shall comprise a copper sleeve arranged around the core of the magnet 63 so as to delay the release of the armature for a predetermined length of time after the breaking of the magnet circuit. Thus, during the breaking of the line circuit Line 1, Line 2 during the dialing operation the magnet 63 will then not release its armature and will therefore hold the coin suspended upon the rod 61 during the entire dialing operation.

By referring again to Figure 2 it will be observed that the local chute 52 is provided with a vertically extending portion 74 immediately below the rod 61. This vertically extending section 74 terminates at its lower end immediately above a slot 75 in the partition plate 28 which in turn is in alignment with a suitable opening in the collection box 29 so that a coin when released from the arresting device or rod 61 will have a vertical drop directly into the collection receptacle 29.

However, immediately above the lower end of the section 74 of the chute 52 we have illustrated an opening 76 through which a pin or rod 77 normally projects so that a coin descending through the vertical section 74 will be arrested by the pin or rod 77. It will also be observed that one side of the vertical section 74 of the chute 52 is provided with a relatively large slot 78 through which a coin may pass sideways out of the chute 54. Thus, a coin which is descending through the section 74 and striking the pin or rod 77, will be diverted through the slot 78 to be refunded, as will hereafter be described.

The rod or pin 77 is illustrated as being connected to the armature 79 of a magnet 80 and is arranged in such manner that during deenergization of the magnet 80 the pin or rod 77 will be projected into the chute 52. The magnet 80 is illustrated as of the polarized type so that it will effectively operate its armature 79 only when current is passed through the magnet 80 in a predetermined direction and current traveling in the opposite direction will have no effect upon the armature 79.

As will be understood by those skilled in the art, current on the line circuit Line 1, Line 2 will normally be in a given direction so that upon the initial attempt to make a call from the station under consideration current on the line circuit will be in a definite direction, for example, line 1 will be positive and line 2 will be negative.

Thus, by selecting the directional characteristic of the polarized magnet 80 for the proper direction any current which flows in the line circuit at this time will be ineffective to operate the armature 79 of this magnet. Thus, upon lifting the receiver 7 to make a call the magnet 63 will be energized to arrest the coin but the magnet 80 will not be effectively energized to withdraw the pin or rod 77. Hence, a person desiring to use the 'phone and depositing a nickel in the coin gauge 32 will be permitted to dial to select the station to which he desires to speak and the coin will come to rest upon the pin or rod 61. If for any reason he is unable to obtain connection to the called station the coin will be refunded to him. For example, if the line circuit Line 1, Line 2 is out of order (for example no current on the line) the magnet 63 would not be energized to arrest the coin and the coin would pass immediately to the section 74 of the chute 52 where it would engage the pin 77 and be diverted into the refund path.

On the other hand, if the line is in order but he is unable to obtain connection with the called station, immediately upon restoring the receiver 7 to its hook 8 the circuit to the magnet 63 would be broken and the pin or rod 61 would be withdrawn from the chute 52 and the coin would descend to the path or rod 77 and be diverted to the refund path.

By referring particularly to Figures 2 and 3 it will be observed that a plate 81 is provided near the lower end of the chute 52 which extends from the rear end to the right hand side of the refund chute 23 associated with the dime and quarter slots 37 and 38 to a cup 82 secured to the cover 2 immediately behind a refund or coin return opening 83 in the cover 2. This cup 82 constitutes the refund receptacle. It will also be observed that the plate 81 passes immediately below and to the right hand side of the slot 78 in the local collection chute 52 so that a coin which passes through the slot 78 will fall upon the plate 81 and thus be directed into the refund receptacle 82.

However, as will be understood by those skilled in the art the successful selection of a called station will cause current to flow in the line circuit Line 1, Line 2 immediately upon the response of the called station as by the called party lifting his receiver at his station in a direction opposite to that which previously flows through the line circuit, that is, Line 1 will now become negative while Line 2 becomes positive. Such reverse current will be effective to operate the polarized magnet 80 so as to cause this magnet to operate its armature 79 to withdraw the pin 77 from the chute 52. Thus, a coin which had been arrested by the rod 61 will, upon its release, descend through the vertical section 74 of the slot 52 to pass unobstructedly into the collection receptacle 29.

By referring particularly to Figure 9 it will be observed that the armature 79 of the reverse current or polarized relay 80 has associated therewith a switch 85 comprising contacts 86, 87 and 88. Contacts 87 and 88 are illustrated as being normally open but arranged to be closed when the armature 79 is operated by the magnet 80. The contacts 87 and 88 are illustrated as being connected to a pair of conductors 89 and 90, which shunt the circuit for magnet 63 so that immediately upon the response of a called station the energization of the magnet 80 will cause a de-energization of the magnet 63. Thus, the response by the called station causes a withdrawal of the pin 61 to allow the coin to descend from the arresting pin to the section 74 of the slot 52 and since there is no obstrcuction in this slot the coin will pass immediately to the collection receptacle.

It will be observed that the collection of the coin is accomplished at the instant that the called station is successfully obtained instead of delaying the collection of the coin until after the talking by the calling party is completed.

It will be observed that the connection of the polarized magnet 80 to the line circuit Line 1, Line 2 is such that irrespective of what action takes place in our telephone station the connection of another station to the line circuit will render the talking and listening circuits of our station operative. Thus, any incoming call immediately renders our station effective for reply.

Also, this connection of the polarized magnet 80 permits the 'phone, when once the successful connection to a called station has been obtained, to continue to be operative to talk irrespective of interruptions in the line circuit by either station so long as the called station remains connected to the line circuit or is re-connected to the line circuit. That is, interruptions of the line circuit as by the called party inadvertently operating the hook switch or the transfer of a call at a PBX or ICS system, at the called station, will not lock out the calling station to require the deposit of an additional coin to continue the call.

This result is accomplished by connecting the circuit of the resistance (magnet coil 49) through contacts 86 and 87 which are operated by the reverse current magnet 80 so that at any time that the reverse current magnet 80 is energized the resistance is effectively removed from the line. Thus, in the case that the resistance 49 should be arranged to make the talking and listening circuits inoperative these circuits would immediately become re-operative as soon as the called station is restored to the line.

By referring particularly to Figures 2 and 4 it will be observed that the deenergization of the slow release magnet 63 from any calls will restore the switch operating arm 54 to open circuit position. For this purpose we have arranged a rod 91 upon a pivot 92 secured as at 93, the rod 91 having one portion 94 arranged immediately in the rear of the pin or rod 61 so that rearward movement of the rod 61 rotates the rod 91 to cause its other end 95 to engage and force the operating arm 54 of the switch 55 to its inward or open circuit position. Thus, upon the passage of the coin from the arresting pin 61 the switch 55 is restored to normal condition for operation upon the next call which is attempted at our station.

By referring again, particularly to Figure 2, it will be observed that the polarized magnet 80 is provided with a permanent magnet 96 for the purpose of making this magnet directional selective. It will be further observed that the slow release magnet 63 is mounted immediately above the polarized magnet 80. We have discovered that by inserting a piece of magnetic material 97 between the lower end of the core of magnet 63 and the upper end of the permanent magnet 96 that the magnetic field from the permanent magnet will assist the magnetic field of the coil 63 and will thus strengthen the magnet 63 to assist it in operating its armature.

By referring also to Figure 2 it will be observed that the collection receptacle 29 is illustrated as constituting a box-like structure, the interior of which may be divided into two compartments 98 and 99 as by means of a vertically extending partition 100. The purpose of the partition 100 is to effectively divide collections made for local calls from collections made for long-distance calls. By arranging the partition 100 at some point between the slots 27 and 75 in the plate 28 all local collections will enter compartment 99 while all long-distance collections will enter compartment 98.

By mounting the partition plate 100 for lateral adjustment within the box or receptacle 29 the amount of space allowed to either local or long-distance collections may be varied to suit the particular condition existing at any given station.

The operation of our telephone station will best be understood with reference to an assumed series of operating conditions.

Let us assume that it is desired to make a local call. Prior to the lifting of the receiver 7 from the hook 8 the transfer basket 21 is held in its rearward position to effectively connect the slots 37 and 38 to the dime and quarter refund chute 23 and to connect the nickel chute 36 to the local chute 52. Should a coin be inserted in any of the slots 36, 39 or 38 the same would be immediately passed to the refund or coin return receptacle 82. That is, a coin deposited in the dime slot or the quarter slot would immediately pass to the refund chute 23 and thence by way of the plate 81 to the refund receptacle 82, while a coin inserted in the nickel slot 36 would pass to the local chute 52. At this time, however, the magnet 63 would not be energized (its circuit being broken at the receiver hook switch contact 65, 66) so that the coin would not be arrested but would pass to the section 74 of the chute 52.

Also, at this time the pin or rod 77 is projected into the chute 52 (there being no reverse current on the line) and the coin would strike the pin 77 and be diverted through the slot 78 and by way of the plate 81 to the refund receptacle 82. Thus, even though coins should be improperly deposited at this time the user would not be penalized for such mistaken operation.

Assuming that the user now lifts the receiver 7 from the hook 8, the rod 46 would be withdrawn but the hook switch closes its contacts 65, 66 to immediately energize the magnet 49 by way of a circuit which extends from line 1 through conducts 101 and 89, contacts 87, 86 (normally closed) on reverse current magnet 80, conductor 102, switch contacts 56, 57 of spring switch 55 (now closed since no coin is deposited), conductor 103, the coil of magnet 49, conductor 104, switch contacts 66 and 65 on hook switch 64 (now closed since the receiver is lifted), to line 2. Hence, though the mechanical support for the transfer basket is removed an electrical circuit support through the agency of the armature 50 of magnet 49 and its associated rod 51 still maintains the transfer basket in its rearward position.

Hence, if at this time a person should mistakingly insert coins in the dime or quarter slots they would immediately be refunded.

However, the station is now conditioned for the insertion of a coin in the nickel slot to make a local call.

It will be observed that at this time the magnet 49 is shunted across the line circuit Line 1, Line 2 so that the resistance of this coil constitutes an effective block to prevent the operation of the dial selecting device to select a called station.

Assuming now that the user deposits a coin, for example, a nickel, in the coin gauge 32, the coin will pass through the slot 36 and into the local chute 52. Since the receiver hook switch 64 is now in position to close contacts 65 and 66 the coil of the magnet 63 is energized and the pin 61 is projected into the local chute 52 to arrest the coin. As the coin falls to the arresting pin it passes and operates the trip switch 55, thus opening the circuit to the magnet 49 and removing the resistance which has heretofore rendered the calling dial inoperative to select a desired station.

At this time the operation of the trip 54 and release of the magnet 49 permits the transfer basket 21 to move forwardly into a position of alignment with each of the long-distance slots 24, 25 and 26, thus conditioning the station for a long-distance call if such is desired.

The user may dial the selected number which will cause operation of the line circuit Line 1, Line 2 to operate the central station selectors to connect the desired called station to the calling station. If the called station does not respond, for example, if that line is busy or because there is no one present to answer the 'phone or that line is out-of-order, the calling party may return the receiver 7 to the hook 8 to disconnect the magnet 63, whereupon the rod 61 will be withdrawn and the coin will descend in the local chute 52 and be refunded through the slot 78 in this chute.

On the other hand, if the called station responds, the connection of the called station to the calling station causes reverse current to flow over the line circuit and the reverse current magnet 80 will be energized to remove the pin 77 which has been blocking the collection branch of this chute and to open the circuit to shunt the circuit to the magnet 63 to permit this magnet to release the coin and permit collection.

The calling party may then proceed with conversation. When the conversation is completed and the calling party returns the receiver to the hook 8 the circuit to the reverse current magnet 80 is broken and all of the apparatus is restored to the original conditions assumed at the beginning of this description.

Assuming that a party desired to make a long-distance call, the station will be originally in the same condition as hereinbefore described, that is, the transfer basket would be aligned with the lock 52 and with the refund chute 23 until the removal of the receiver from the hook. Again, however, the removal of the receiver connects magnet 49 across the line and holds the transfer basket 21 in the refund and local position.

Hence, it is necessary for the person desiring a long-distance call to deposit a coin to render the station operative to connect to a long-distance operator. Assuming that a coin is inserted in the nickel slot it will pass to the arresting pin 61 as hereinbefore described, operating the switch 55 to remove the resistance 49 from the circuit and permitting the person to dial the long-distance operator.

However, it will be understood by those skilled in the art that the response by the long-distance operator will send current over the line circuit Line 1, Line 2 in the same direction to that which has previously flowed in this circuit so that the reverse current relay will not be operated. The calling party may then ask the long-distance operator to connect the station with the desired party. The person calling may either return the receiver to the hook while waiting for the long-distance connection or may hold the receiver from the hook until the connection is made.

In the first case the return of the receiver to the hook without the previous energization of the reverse current 80 will permit the original coin to be refunded as by withdrawing the pin 61 from the chute 52. The long-distance operator may then recall the station when she has secured the connection. The receiver being on the hook holds the receiver hook switch 64 in condition to close the ringing circuit for the station so that the long-distance operator may ring the station.

However, the current which now flows through the line circuit Line 1, Line 2 is the reverse direction from that which previously flows since the operator is calling the station, so that upon removal of the receiver from the hook when the calling party answers the long-distance operator circuit connections are immediately made to energize the reverse current magnet 80 with current in the proper direction to operate armature 79. The operation of magnet 80 removes the resistance 49 from the circuit by opening switch contacts 86, 87, thus conditioning the station for talking and listening to and from the long-distance connection.

However, the disconnection of the coil 49 allows the transfer basket 21 to move to its forward position ready for the collection of the necessary toll of a long-distance call so that the long-distance operator may now request deposit of the necessary coins which will pass through the coin maze to be immediately collected in the collection receptacle 29.

On the other hand, if the calling party holds the receiver from the hook 8 while awaiting the connection, the magnet 63 will remain energized so that when the connection is made to the long-distance station the coin inserted to make connection with the long-distance operator is still maintained in the chute 52. The long-distance connection, however, will not send reverse current over the line circuit so that the reverse current magnet 80 will not operate. The long-distance operator may then request the deposit of the necessary toll for the long-distance call.

At this time the transfer basket 21 is in its forward position since the magnet 49 is deenergized so that any coins deposited in the coin gauges 32, 32' and 32" will pass through the associated coin chutes 24, 25 and 26 to go immediately into the collection receptacle 29. These coins passing through the coin maze will operate the usual bells and gongs so that the long-distance operator may determine the amount of toll which has been deposited.

The calling party may then converse with the long-distance station and upon the completion of the call, the calling party restoring the receiver to the hook 8 will break the circuit for the magnet 63 thus releasing the original coin deposited to obtain the long-distance operator. However, during all of this operation the reverse current magnet 80 has been energized so that the released coin will fall upon the pin 77 and be diverted through the slot 78 to the refund receptacle 82, thus returning the original coin to the calling party.

It will be understood by those skilled in the art that certain calls should be made free of collection charges. For instance, to call the office of the telephone company or to make certain other calls to the telephone company stations, such as wire-chief, long-distance operator, fire, police and ambulance calls, this may readily be accomplished with our telephone station by permitting the connections made to those particular called stations to maintain current upon the line circuit in the same direction as that initially present on the line circuit when the call is initiated. That is, it will require the deposit of a coin in the nickel slot 36 to obtain the connection but immediately upon completion of the call and restoring of the receiver to the hook, such coin will be automatically refunded to the calling party.

It will be understood by those skilled in the art that the coin collecting device may be readily used in connection with manual telephone operation instead of automatic dial selection. In this case the resistance 49 shunted across the line circuit will be so arranged as to prevent active communication with the central station until a coin has been deposited to remove this resistance from the circuit.

It will be understood by those skilled in the art that the circuits to the central station may be so arranged that upon the securing of response by a called station current will flow in the calling line circuit in the proper direction to operate the reverse current magnet 80, while if the called station is a "free" station the current which is supplied to the calling line circuit will be in a direction preventing the operation of magnet 80. Thus, the collection of the coin is removed from the control of the central station operator and is made automatic, dependent upon whether the called station requires toll payment or is a "free" station. In either event, however, the restoration of the receiver 7 to the hook 8 before a complete connection has been accomplished will break the circuit to magnet 63 to release the coin which will be refunded because polarized magnet 80 has not been energized.

It will also be observed that the complete toll collection and refunding system in our telephone station is self-contained in the station and that no special apparatus is required at the central station distinguishing the line circuit for this station from the line circuits which would be employed for a non-pay station. Under these conditions, it is entirely feasible to connect to the same line circuit one or more pay stations of the character described herein and also to connect such line circuit to a non-pay extension which will permit the line circuit to be employed for ordinary non-pay service. Such connections are illustrated in Figure 9 as extending by way of the conductors 106 and 107 from line conductors Line 1, line 2, respectively, to a non-pay extension indicated by the legend "Non-pay extension".

While the particular form of apparatus herein described is well adapted to carry out the objects of the invention, it is to be understood that various modifications and changes may be made without departing from the scope of the invention as set forth in the appended claims.

We claim:

1. In a telephone station requiring the deposit of a coin to make a call and having a coin-refunding device, a receptacle to which said refunded coin passes, a coin passage leading to said refunding receptacle, and a call bell for said station, said bell being mounted in said passage to be struck by a coin passing therethrough.

2. In a pay telephone station for both local and toll calls, a plurality of coin chutes, one for each of several different denomination coins, each of said chutes having two branches, one leading to a collection receptacle and another leading to a refund chute, a local coin chute comprising said other branch for one of said chutes and having therein means diverting coins from a collection receptacle to the refund chute, means operable responsive to lifting the receiver at said station for directing coins in all of said chutes to said other branches, and means operable by passage of a coin in said local coin chute for restoring said coin directing means to collecting position.

3. In a pay telephone station for both local and toll calls, a coin-collecting system including a plurality of coin deposit slots, one for each of a plurality of different denomination coins, a chute for each of said coin slots for toll collections, leading to a collection receptacle, a second chute for one of said slots through which a coin must pass for local calls, and means operable upon lifting of the receiver of the station for blocking all of said toll-collection chutes and for switching coins deposited in said one slot to the local chute, and means operably responsive to the passage of a coin in said local chute for moving said blocking means to collecting position.

4. In a pay telephone station, a collection receptacle having a "toll" compartment and a "local" compartment to segregate toll collections from local collections, a coin chute having a branch leading to said toll compartment, and a second branch leading to said local compartment, means operable upon initiating of a call for diverting a coin in said chute to said local branch, and means operable by the first deposited coin for diverting all other coins to said toll branch.

5. In a pay telephone station, a collection receptacle having a "toll" compartment and a "local" compartment to segregate toll collections from local collections, a coin chute having a branch leading to said toll compartment and a second branch leading to said local compartment, means operable upon initiation of a call for diverting the first coin deposited in said chute to said local branch and means operable by the first deposited coin for diverting all other coins to said toll branch, means in said local branch for holding said first deposited coin therein, and means for refunding said first deposited coin.

6. In a pay telephone station requiring the deposit of a coin to make a call, a housing for talking and calling apparatus for said station, a refund receptacle on said housing for receiving coins refunded to patrons, a call bell for said telephone station, and means mounting said call bell on said housing adjacent said refund receptacle to be struck by coins passing to said refund receptacle.

7. In a pay telephone station for both local and toll calls, a plurality of coin chutes, one for each of several different denomination coins, each of said chutes having coin-diverting means movable to one position to direct coins therein to a refund receptacle and to another position to divert coins to a collection receptacle, a receiver and movable receiver hook for said telephone station, means operably responsive to depression of said receiver hook for moving said diverting means to refund position, means for holding said diverting means in refund position after lifting of the receiver hook, a local coin collection chute, and means operable by the passage of a coin through said local chute for releasing said holding means to move said diverting means to collecting position.

8. In a pay telephone station for both local and toll calls, a plurality of coin chutes, one for each of several different denomination coins, each of said chutes having coin-diverting means movable to one position to direct coins therein to a refund receptacle and to another position to divert coins to a collection receptacle, means normally holding said diverting means in refund position, a local coin collection chute, and means operably responsive by the passage of a coin in said local chute for releasing said holding means to move said diverting means to collecting position.

9. In a pay telephone station for both local and toll calls, a plurality of coin chutes, one for each of several different denomination coins, each of said chutes having coin-diverting means movable to one position to direct coins therein to a refund receptacle and to another position to divert coins to a collection receptacle, a receiver and a movable receiver hook for said telephone station, a local coin collection chute, means operably responsive to the lifting of said receiver hook for holding said coin-diverting means in refund position, and means operably responsive to the passage of a coin through said local chute for moving said diverting means to collecting position.

10. In a pay telephone station for both local and toll calls, a plurality of coin chutes, one for each of several different denomination coins, a transfer basket interposed in all of said chutes movable to one position to divert coins therein to a refund receptacle and to another position to divert coins to a collection receptacle, means for holding said transfer basket in refund position, a local coin collection chute, and means operably responsive to the passage of a coin through said local chute for releasing said holding means to move said transfer basket to collecting position.

11. In a pay telephone station, a housing for the telephone, a coin collecting device in said housing including a coin deposit slot, a pair of coin chutes leading from said slot, the first of said chutes leading direct to a collection receptacle, the second of said chutes being provided with means for arresting a coin therein, means interposed between said slot and said chutes for directing coins from said slot to one or the other of said chutes, means normally holding said coin directing means in a position to direct coins to said second chute, and means operable by the passage of a coin into said second chute for operating said coin directing means to direct subsequently deposited coins to said first chute.

12. In a pay telephone station, a housing for the telephone, a receiver and a hook therefor, a coin collecting device in said housing including a coin deposit slot, a pair of chutes leading from said slot, the first of said chutes leading direct to a coin collection receptacle, the second of said chutes also leading to said coin collection receptacle but having coin arresting means interposed therein, coin directing means interposed between said slot and said chutes to direct coins from said slot to one or the other of said chutes, means normally holding said coin directing means to direct coins into said second chute, means in said second chute operable by the passage of a coin therethrough for moving said coin directing means to direct subsequently deposited coins to said first chute, and means operable by depression of said receiver hook for returning said coin directing means to normal position.

RALPH D. COLLINS.
WILLIAM M. REID.
STANLEY E. BOURNE.